(12) United States Patent
Huang et al.

(10) Patent No.: US 8,574,691 B2
(45) Date of Patent: Nov. 5, 2013

(54) STARCH-BASED ADHESIVE COMPOSITIONS AND USE THEREOF

(75) Inventors: Tianjian Huang, Hillsborough, NJ (US); Hui Yang, Bridgewater, NJ (US)

(73) Assignee: Henkel Corporation, Rocky Hill, CT (US)

( * ) Notice: Subject to any disclaimer, the term of this patent is extended or adjusted under 35 U.S.C. 154(b) by 14 days.

(21) Appl. No.: 13/216,563

(22) Filed: Aug. 24, 2011

(65) Prior Publication Data
US 2013/0052379 A1    Feb. 28, 2013

(51) Int. Cl.
*B32B 27/10* (2006.01)
*B32B 1/02* (2006.01)

(52) U.S. Cl.
USPC .......................... 428/34.3; 428/34.2; 428/35.7

(58) Field of Classification Search
USPC ............... 428/35.2, 35.7, 34.2, 34.3
See application file for complete search history.

(56) References Cited

U.S. PATENT DOCUMENTS

| | | | | |
|---|---|---|---|---|
| 2,145,195 A | * | 1/1939 | Bauer et al. | 106/205.31 |
| 2,430,459 A | * | 11/1947 | Farrell et al. | 383/116 |
| 3,524,827 A | * | 8/1970 | Kryger et al. | 524/51 |
| 3,719,514 A | * | 3/1973 | Taylor | 106/208.4 |
| 5,804,024 A | * | 9/1998 | Bloch et al. | 156/272.6 |
| 6,228,158 B1 | * | 5/2001 | Skuratowicz | 106/208.1 |
| 2006/0269679 A1 | | 11/2006 | Patil | |

FOREIGN PATENT DOCUMENTS

| | | |
|---|---|---|
| EP | 0952919 B1 | 4/2002 |
| GB | 1 456 629 * | 11/1976 |
| JP | 06340755 A | 12/1994 |
| JP | 08253757 A | 10/1996 |
| JP | 08269416 A | 10/1996 |
| WO | 9504082 A2 | 2/1995 |
| WO | 9831539 A1 | 7/1998 |

OTHER PUBLICATIONS

Sealmaster P30L and Sealmaster P50L. Multiwall Bag Adhesive, Grain Processing Corporation, Retrieved from http://www.grainprocessing.com/industrial-starch-products/multiwall-bag on Sep. 27, 2011.

Wurzburg, O.B. Modified Starches Properties and Uses, CRC Press, Inc., Aug. 1986.

* cited by examiner

*Primary Examiner* — Erik Kashnikow
(74) *Attorney, Agent, or Firm* — Sun Hee Lehmann

(57) ABSTRACT

An improved adhesive composition having increased bond strength between a celluosic board and plastic film substrate is provided. The adhesive composition having improved adhesion includes a modified starch component, polyethylenimine and water. Articles having improved adhesion and methods of making the articles having improved adhesion are also provided.

9 Claims, No Drawings

STARCH-BASED ADHESIVE COMPOSITIONS AND USE THEREOF

FIELD OF THE INVENTION

The present invention relates to adhesive compositions that comprise a starch based adhesive for bonding celluosic board to plastic films. More particularly the invention relates to adhesives for flexible laminating applications, making these adhesives particularly well suited for multiwall pasted valve bags or envelope windows.

BACKGROUND OF THE INVENTION

Multiwall bags are useful for packaging many different types of products, such as pet food, flour, sugar, fertilizer, sand, dry cement, yard waste, and the like. Typically, the bags are constructed with several layers of substrates: typically at least one kraft paper with at least one plastic film, foil or laminated sheet. The substrates are laminated (attached) together with adhesives. Depending on the content and weight of the product, the adhesive is applied to the entire substrate or in a specific patterns or lines.

The laminated substrates are cut to appropriate size and then filled by machinery, and the ends are formed. During the filling process, it is desirable for the substrates to remain adhered. Delamination of the substrates during the filling stage causes inadequate and inefficient filling, resulting in process delays and waste.

In recent years, there has been a growing demand for finding ecologically friendly resources to reduce the impact on human health and the environment. Adhesives made from natural components, such as starch is renewable and thus, environmentally conscious. Starch-based adhesives are widely used on celluosic board for attachments; however, they are not generally used for flexible plastic substrates due to no or low adhesion properties. Traditionally, synthetic adhesives, particularly, acrylic polymer based pressure sensitive adhesives, have been used for flexible plastic substrates.

There is a need in the art for a laminating adhesive that adheres to both cellulosic board and flexible plastic films that can be prepared at low cost and with low ecological impact. The current invention fulfills this need.

BRIEF SUMMARY OF THE INVENTION

The invention provides adhesives that adhere to both celluosic board and plastic film substrates.

In one embodiment, the adhesive comprises a modified starch, polyethylenimine, and water.

Another embodiment of the invention provides an adhesive where the addition of 0.1 to 5.0 weight percent (wt %) of polyethylenimine in a starch-based adhesive, whereby the adhesive improves adhesion by at least 100% over an adhesive without any polyethylenimine.

Yet another embodiment of the invention provides a method of preparing a flexible laminant article, including the steps of: providing a celluosic board having a first side and second side and a plastic film having a first side and second side; preparing an adhesive composition including the steps of combining the modified starch, polyethylenimine and water to form an adhesive mixture; applying the prepared adhesive onto either the first side of the celluosic board or the first side of the plastic film; mating the adhesive with the remaining second substrate; and drying the adhesive composition.

Still another embodiment of the invention provides an article of manufacture comprising the adhesive composition described herein. The article comprises at least one celluosic board substrate and at least one plastic film substrate bonded together with an adhesive comprising modified starch and polyethylenimine. Articles of manufacture encompassed by the invention include multiwall pasted valve bags, envelope windows and the like.

DETAILED DESCRIPTION OF THE INVENTION

All references are incorporated herein.

The present invention is based on the discovery that the addition of polyethylenimine, even in small quantities, in a starch-based adhesive, allows for adhesion onto plastic film substrates and allows the starch-based adhesive to be more flexible. The adhesive composition described herein is made from substantially natural, substantially biodegradable materials, and the end result is a more environmentally conscious product.

The adhesive composition may be made from a number of materials. Desirably, the adhesive composition includes modified starch, polyethylenimine and water. The adhesive composition may further include one or more humectants, preservatives, defoamers, fillers and/or stabilizers. Other materials that do not adversely affect the adhesive and adhesive properties of the adhesive composition may be used as desired.

Starches that can be used in the practice of the invention are not particularly limiting and include all starches derived from a native source, any of which may be suitable for use herein. A native starch as used herein, is one as it is found in nature. Also suitable are starches derived from a plant obtained by standard breeding techniques including crossbreeding, translocation, inversion, transformation or any other method of gene or chromosome engineering to include variations thereof. In addition, starch derived from a plant grown from artificial mutations and variations of the above generic composition, which may be produced by known standard methods of mutation breeding, are also suitable herein.

Typical sources for the starches are cereals, tubers, roots, legumes and fruits. The native source can be corn (maize), pea, potato, sweet potato, banana, barley, wheat, rice, sago, amaranth, tapioca, arrowroot, canna, sorghum, and waxy (i.e., a starch containing at least about 95% by weight amylopectin) or high amylose (i.e., a starch containing at least about 40% by weight amylose) varieties thereof.

Preferred starches are modified starches. Modified starches are starches that have been chemically, physically or enzymatically modified to be more stable against heat and cold, have lower swellability in water and have better flow properties. Physically modified starches, such as sheared starches, or thermally-inhibited starches described in the family of patents represented by WO 95/04082, are suitable for use herein. Chemically modified starch include, without limitation, those which have been crosslinked, acetylated and organically esterified, hydroxyethylated and hydroxypropylated, phosphorylated and inorganically esterified, cationic, anionic, nonionic, hydrophobic, and zwitterionic, and succinate and substituted succinate derivatives thereof. Such modifications are known in the art, for example in *Modified Starches: Properties and Uses*, Ed. Wurzburg, CRC Press, Inc., Florida (1986). Conversion products derived from any of the starches, including fluidity or thin-boiling starches prepared by oxidation, enzyme conversion, acid hydrolysis, heat and or acid dextrinization, thermal and or sheared products are also useful.

Particularly preferred modified starches include hydroxypropylated starch and acetylated corn starch, available as N Lite L and KOFILM 93, respectively, from National Starch and Chemical Company. The modified starch component is present from about 10 to about 50 wt %, prior to setting (gelatinizing) of the composition. In a preferred embodiment, the modified starch component is present from about 15 to 25 wt %, based on the total weight of the adhesive composition, prior to setting of the composition.

The adhesive further comprises an adhesion promoter, specifically, polyethylenimine. While metal-based adhesion promoters are available, such as organic titanate and organic zirconate, they fail to form uniform adhesive film and/or gel too quickly for application leading to non-uniform film formation.

Polyethylenimine is a branched chain polymer having primary, secondary and tertiary amines with a branching site every 3 to 3.5 nitrogen atoms and a base structure of $(CH_2CH_2NH)_x$, where x ranges from $10\text{-}10^5$. Useful polyethylenimine for the adhesive include polyethylenimine with an average molecular weight ranges from about 10,000 to about 2,000,000, preferably from about 20,000 to about 1,000,000. Polyethylenimines with molecular weights above the desired weight are difficult to incorporate into the adhesive composition and the stability of the adhesive also becomes poor: adhesive thickens and gels. However, the use of polyethylenimines that has molecular weights lower than the desired weight fails to improve the bond strength of the adhesive.

Suitable polyethylenimine includes Lupasol® series from BASF, particularly, Lupasol® WF, Lupasol® HF, Lupasol® P, Lupasol® PS and Lupasol® SNA.

It has been discovered that even with small quantities of polyethylenimine, the bond strength of the adhesive improves by 100%. The polyethylenimine is present in the adhesive composition in any amount, and desirably is present in an amount of from about 0.1 to about 5.0 wt % of the adhesive composition prior to setting of the composition, and more desirably from about 0.5 to 1.5 wt % of the adhesive composition prior to setting of the composition.

The adhesive composition further includes a preservative. Preservatives for use herein include those conventionally used in aqueous adhesives such as benzoates, amides and fluorides such as sodium fluoride. Also included are the hydroxybenzoic acid esters such as p-hydroxybenzoic acid methyl ester or p-hydroxybenzoic butyl ester. Useful preservatives in the present invention include 1,2-benzisothiazolin-3-one, and the like. Commercially available preservatives which may be used in the practice of the invention include KATHON LX1.5 (for pH≤7) sold by Dow Chemical Company, Nipacide OBS sold by Clariant and Poxel BD 20 (for pH≥7) from Arch Chemicals. The preservative will generally be included in amounts of from 0.05% to about 5.0% by weight of the adhesive composition prior to setting of the composition. Preservatives may be used in the amount of from about 0.05% to about 0.20% by weight.

The adhesive composition may include any optional components, including humectants, stabilizer, defoamers and/or fillers.

Humectants useful in the present invention aid in maintaining viscosity stability of the composition, and may include, for example, glycerol, glycerine, urea, propylene glycol, glyceryl triacetate, sugars and sugar polyols such as sorbitol, xylitol, and maltitol, polymeric polyols such as polydextrose, natural extracts such as quillaia or lactic acid, or any other desired composition having humectant properties. Humectants may be useful in the present invention in an amount of up to about 15% by weight of the adhesive composition prior to setting of the composition.

Stabilizers also aid in maintaining stable viscosity of the composition, and help stabilize emulsions. Exemplary stabilizers include nitrates, phosphate, acids, and the like. Useful stabilizers for the adhesive composition include sodium nitrate, 1,2,3-propanetricarboxylic acid, 2-hydroxy; phosphoric acid, monosodium salt; and the like.

Useful defoamers include Foamaster NXZ from Cognis Corporation, Dee Fo 2020E/50 from Munzing Corporation, and the like. Exemplary fillers include fumed and fused silica, clay, calcium carbonate, and the like.

The present invention provides a method of preparing an adhesive composition having improved bond strength to celluosic board and plastic film substrates. The adhesive composition may be prepared immediately prior to forming the laminate or it may be prepared in advance and stored until needed. The adhesive can remain within the acceptable viscosity range of about 1,000 cPs to about 10,000 cPs for at least 60 days without gelling and without phase separation. The adhesive composition is prepared by combining the starch, polyethylenimine, and water. If desired, optional components may be added to the mixture.

Laminated articles include multilayer structure comprising at least two substrates adhered together by an adhesive. Substrates include celluosic boards, plastic films, foil and laminated sheets.

Celluosic board is typically porous and high elasticity and high tear resistance. Exemplary celluosic board is kraft paper, which is made from wood pulp. Any kraft paper, whether virgin or bleached, ranging from 25 to 80 pounds weight is useful in the laminated article.

The primary function of the plastic film substrate is barrier protection from air, grease, moisture. Durability, e.g., puncture, tear and scratch resistance, is also important for the plastic film substrate. Useful plastic films include nylon (polyamide); polyolefin such as polyethylene, polypropylene, biaxially oriented polypropylene, polyethylene terephthalate, polyethylene terephthalate polyester, polytrimethylene; polyester; polyvinyl chloride; polystyrene; and the like. The plastic films can be used as untreated or treated with corona treatment, which exposes the film to a high voltage electrical discharge to increase the polarity of the surface. Preferably, the surface of the plastic film is treated at 38 dynes/cm or higher.

The plastic film substrate of the multiwall bags may have any thickness, desirably from about 0.1 to 4.0 mil, preferably 0.5 to about 2.0 mil thickness.

The present invention is further related to multiwall bags. Multiwall bags are constructed laminants; several layers of celluosic boards adhered to plastic films. Any known process of forming multiwall bags may be used. In one embodiment, a predetermined amount of the adhesive composition is applied to either the celluosic board or the plastic film substrates in any configuration desired, including series of dots, stripes, waves, checkerboard patterns, any general polyhedron shapes that have substantially flat base, and combinations thereof. Desirably, the thickness of the adhesive composition ranges from about 0.75 to about 3.0 mil, on a wet basis, before gelling. If desired, the adhesive composition may be applied to the first surface covering the entire first surface or covering a portion of the first surface. The second substrate is applied to the top of the adhesive composition, forming a sandwich configuration of: first substrate-adhesive-second substrate.

It is desirable that the contacting of the second substrate onto the adhesive be performed under a slight pressure, so as to effectively join the two substrates together, but excessive pressure is to be avoided (to avoid squeezing out the adhesive from the point of contact). At this point, an uncured or unset laminate article is formed, where the celluosic board and the plastic film are secured to each other via the adhesive, but the adhesive has not been set. If desired, the uncured laminate article may be exposed to heat, e.g., oven or via contact with heated rollers) sufficient to begin gelatinization of the adhesive.

Additional substrates layers may be attached to the above described article to form the multiwall bags.

In another embodiment, the present invention is related to envelope windows. Envelope windows are constructed with at least one layer of celluosic board and at least one layer of plastic film. Any known process of forming an envelope with a plastic film cover as the window may be used. In one embodiment, a predetermined amount of the adhesive composition is applied to either the celluosic envelope or the plastic film substrates in any configuration desired, including series of dots, stripes, waves, checkerboard patterns, any general polyhedron shapes that have substantially flat base, and combinations thereof. Desirably, the thickness of the adhesive composition ranges from about 0.75 to about 3.0 mil, on a wet basis. In addition, if desired, the adhesive composition may be applied to the first surface covering the entire area to be adhered or covering a portion of the area to be adhered. The second substrate is applied to the top of the adhesive composition, forming a sandwich configuration of: cellulose envelope-adhesive-plastic film window.

Like the multiwall bag, it may be desirable that the contacting of the second substrate onto the adhesive be performed under a slight pressure.

It has been discovered that through the use of the present adhesive composition, the adhesive has strong adhesion to both celluosic and plastic film substrates. Adhesion promoters can enhance adhesion, but most available adhesion promoters are not suitable for starch-based adhesives. While the addition of tackifiers in an adhesive composition to promote adhesion is known, tackifiers are typically added in amounts greater than 10, preferably greater than 20, and greater than 30 wt %, prior to setting of the composition. Most tackifiers for waterborn adhesives are in 50% solid dispersions or in 100% solid high viscosity liquids. Addition of tackifiers in amounts lower than 10 wt %, typically, fails to improve adhesion. Thus, it is surprising that a mere addition of 0.1-5.0 wt % of polyethylenimine in a starch based adhesive improves the adhesion of cellulose board to plastic film substrate by at least 100%.

EXAMPLES

Components

Organic titanate is an adhesion promoter, available from Kenrich Petrochemicals as KR TTS.

Organic zirconate is an adhesion promoter, available from DuPont as Tyzor 217.

Luposal P is a 50% solids polyethylenimine in water, with an average molecular weight of 750,000, available from BASF.

Kofilm 93 is a modified corn starch available from National Starch and Chemical Company.

Biocide KATHON LX 1.5 is available from Dow Chemical Company.

Sodium nitrate is a stabilizer, available from Univar USA Inc.

Monosodium phosphate is a stabilizer, available from Univar USA Inc.

Water is tap water.

Adhesive Preparation

Adhesive samples were prepared by mixing the starch, stabilizer(s) and water together at room temperature for 20 minutes until a uniform suspension was formed. The mixture was then heated to 200° F., and held at 200° F. for 30 minutes, while continuously stirred. The mixture was then cooled to 100° F., while continuously stirred for 10 minutes. Desired amounts of polyethylenimine, additional water (as necessary) and citric acid were added until the final pH of the mixture was in the range of 7.5-8.0.

Peel Strength Measurement

Peel strength (adhesion) was measured as follows. Samples were prepared by applying an amount of adhesive to obtain 1 mil of dry adhesive onto a 8"×10" area of a plastic film using a wire wound rod. Natural (unbleached) kraft paper was matted onto the adhesive. A 1.5 lb Rubber Roller was manually passed two times to laminate the structure. The structure was then dried at ambient temperature for at least 1 hour, up to 24 hours. The structure was then cut into 1"×6" laminated strips with 2 inch paper over lap. The peel strength was measured by Texture Analyzer TA-XT2iHR, supplied by Texture Technologies Corporation. The uncoated paper end was placed in the lower pneumatic jaws of the tensile tester, configured for 180° peel test PSTC#7, and the jaw was closed. The other end of the uncoated film end was placed into the upper pneumatic jaw of the tensile tester and then closed. The clamp of the tensile tester was set at 180° peel mode at 12"/min to measure the peel strength and the Tmax was recorded. The reported peel strength is an average of three to five measurements.

Example 1

Comparison of Various Adhesion Promoters

Various adhesion promoters were tested in a starch based adhesive to determine whether the promoter aided in the viscosity and film formation of the adhesive. Acceptable adhesives must be flowable and non-pasty to be applicable, and typically have a viscosity range of about 1,000 cPs to 10,000 cPs. The adhesive, after application, must be uniform and must not bead during film formation to be acceptable.

TABLE 1

| | Ex. | | |
|---|---|---|---|
| | C1 | C2 | 1 |
| Adhesion promoter (wt % based on setting adhesive) | Organic titanate (0.5 wt %) | Organic zirconate (0.5 wt %) | Luposal P (1.0 wt %) |
| Observation for: (1) Adhesive viscosity (2) Film formation | (1) Acceptable (2) Unacceptable: formed a non-uniform film | (1) Unacceptable: gelled into a yogurt-like consistency (2) Unacceptable: not appliable onto substrate due to high viscosity | (1) Acceptable (2) Acceptable |

Only Luposal P, polyethylenimine, in the starch based adhesive as adhesion promoter is acceptable for both viscosity and film formation.

Example 2

Effect of Polyethylenimine

The following adhesive compositions were prepared and the peel adhesions (in gram force per linear inch) were measured. For comparative samples 3 and 4, polyethylenimine was added.

TABLE 2

|  | Ex. | | | |
| --- | --- | --- | --- | --- |
|  | C3 | 3 | C4 | 4 |
| Adhesive Components (wt % based on setting adhesive) | Kofilm 93 (20) Luposal P (0) Water (80.0) | Kofilm 93 (19.8) Luposal P (1.0) Water (79.2) | Kofilm 93 (22.8) Luposal P(0) KATHON LX1.5 (0.1) Sodium nitrate (2.0) Monosodium phosphate (0.1) Water (75.0) | Kofilm 93 (22.6) Luposal P (0.7) KATHON LX1.5 (0.1) Sodium nitrate (2.0) Monosodium phosphate (0.1) Water (74.5) |
| Substrates | 50 lb natural kraft to 0.75 mil corona treated polypropylene film | 50 lb natural kraft to 0.75 mil corona treated polypropylene film | 50 lb natural kraft to 3 mil corona treated polypropylene film | 50 lb natural kraft to 3 mil corona treated polypropylene film |
| Peel Strength (gf/inch) | 140 | 304 | 45 | 196 |

The addition of polyethylenimine, even in quantities of only about 1 wt % (0.5% without water) improves the peel strength by at least two fold (100%). This improvement is more noticeable on thicker substrate and also on polypropylene film (than on polyethylene film). While peel adhesion is dependent upon the substrate choice, thicknesses of the substrate, and the adhesive, the use of polyethylenimine improves the peel strength by at least 100%, regardless of the substrate type and thickness.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. An article comprising at least two substrates and an adhesive composition between them comprising:
    (A) a modified starch;
    (B) a polyethylenimine; and
    (C) water;
    wherein the ratio of the modified starch to the polyethylenimine is 1,000-5,000:100;
    wherein the pH of the adhesive composition ranges from 7.5 to 8.0; and
    wherein at least one substrate is a cellulosic board and a second substrate is a plastic film.

2. The article of claim 1 wherein the cellulosic board is a kraft paper.

3. The article of claim 1 wherein the plastic film is selected from the group consisting of polyamide; polyolefin, biaxially oriented polypropylene, polyethylene terephthalate, polytrimethylene; polyvinyl chloride; and polystyrene.

4. The article of claim 3 wherein the plastic film is surface treated with corona treatment.

5. The article of claim 3 wherein the corona treatment is higher than 38 dyne/cm.

6. The article of claim 4 wherein the plastic film is polyolefin.

7. The article of claim 5 wherein the polyolefin is a corona treated polyethylene or polypropylene film.

8. The article of claim 7 which is a multiwall bag.

9. The article of claim 7 which is an envelope.

* * * * *